(12) United States Patent
Yamamoto

(10) Patent No.: US 7,093,045 B2
(45) Date of Patent: Aug. 15, 2006

(54) METHOD AND APPARATUS FOR BUS ARBITRATION CAPABLE OF EFFECTIVELY ALTERING A PRIORITY ORDER

(75) Inventor: Hitoshi Yamamoto, Hyogo-ken (JP)

(73) Assignee: Ricoh Company, Ltd., Tokyo (JP)

( * ) Notice: Subject to any disclaimer, the term of this patent is extended or adjusted under 35 U.S.C. 154(b) by 369 days.

(21) Appl. No.: 10/067,481

(22) Filed: Feb. 5, 2002

(65) Prior Publication Data

US 2002/0133654 A1    Sep. 19, 2002

(30) Foreign Application Priority Data

Feb. 13, 2001    (JP) .............................. 2001-035257

(51) Int. Cl.
*G06F 13/36*    (2006.01)
(52) U.S. Cl. ...................................... 710/116; 711/151
(58) Field of Classification Search ................ 711/151; 710/1, 113, 116, 240, 241, 244; 326/38
See application file for complete search history.

(56) References Cited

U.S. PATENT DOCUMENTS

| | | | | |
|---|---|---|---|---|
| 4,536,839 A | * | 8/1985 | Shah et al. .................. | 711/151 |
| 4,858,101 A | * | 8/1989 | Stewart et al. ................. | 700/2 |
| 5,583,999 A | * | 12/1996 | Sato et al. ................... | 710/100 |
| 6,029,219 A | * | 2/2000 | Michizono et al. ......... | 710/111 |
| 6,073,132 A | * | 6/2000 | Gehman ........................ | 707/9 |
| 6,133,760 A | * | 10/2000 | Benschneider .............. | 326/106 |
| 6,708,248 B1 | * | 3/2004 | Garrett et al. .............. | 711/104 |

* cited by examiner

*Primary Examiner*—Rehana Perveen
*Assistant Examiner*—Clifford Knoll
(74) *Attorney, Agent, or Firm*—Cooper & Dunham LLP

(57) ABSTRACT

A bus arbitration apparatus includes a storage, a priority order determiner, and an arbitrator. The storage stores a plurality of selection signals for specifying a priority order against a number N of requests. The priority order determiner causes the storage to output one of the plurality of selection signals in a predetermined sequence in response to a demand for arbitration. The arbitrator performs an arbitration operation based on the priority order against the number N of requests specified by one of the plurality of selection signals which is output from the storage.

30 Claims, 10 Drawing Sheets

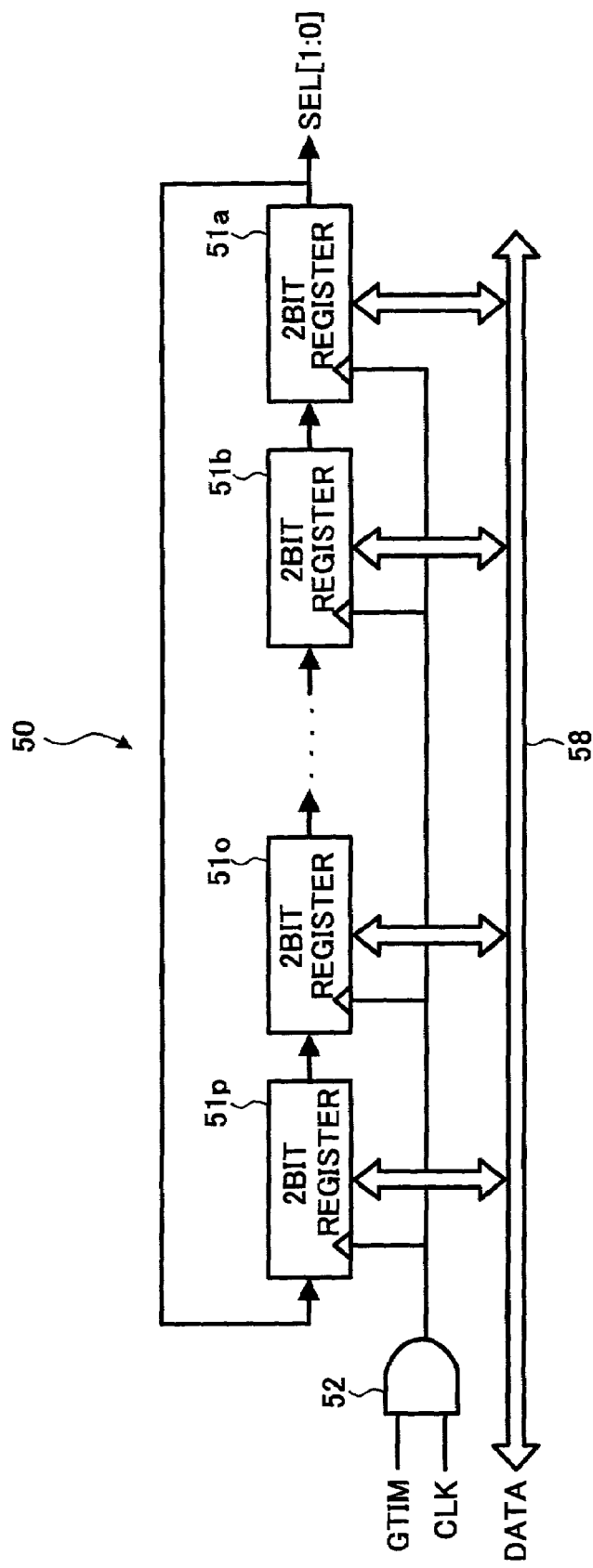

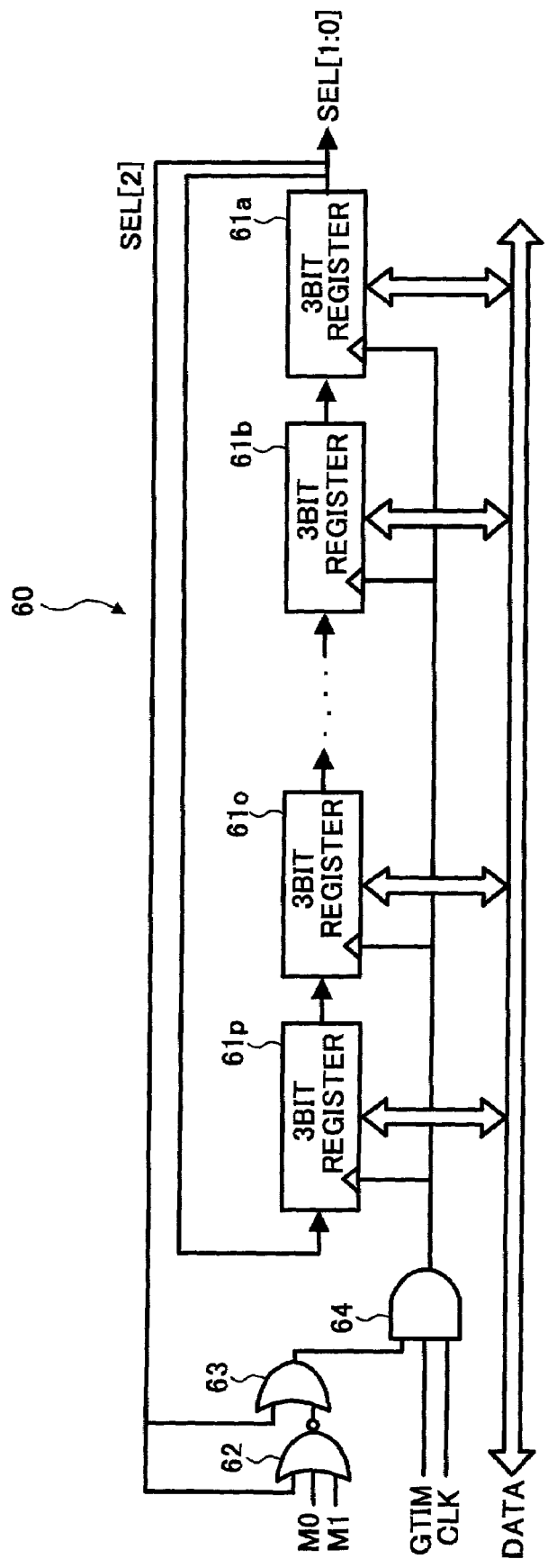

METHOD AND APPARATUS FOR BUS ARBITRATION CAPABLE OF EFFECTIVELY ALTERING A PRIORITY ORDER

BACKGROUND

1. Field

This patent specification relates to a method and apparatus for bus arbitration, and more particularly to a method and apparatus for bus arbitration that effectively alters a priority order for simultaneous bus use requests.

2. Description of Related Art

Conventionally, a bus arbitration apparatus for use in apparatuses such as one having a plurality of DMA (direct memory access) circuits, a multi-processor system having a plurality of CPUs (central processing units), and the like performs an arbitration operation against a plurality of simultaneous requests for use of a system bus from the plurality of DMAs or CPUs in accordance with a fixed priority order. As a result of the arbitration operation, the bus arbitration apparatus provides a permission to use the system bus to the requester determined as having the highest priority based on the fixed priority order. The above-mentioned system bus is typically compatible with devices conforming to an OHCI (open host computer interface) standard of IEEE (Institute of Electrical and Electronics Engineers).

For example, a system having four DMA circuits such as DMA-A, DMA-B, DMA-C, and DMA-D and a single system bus is considered. If this system is provided with a fixed priority order of A>B>C>D, the DMA-A is assigned the highest priority and the DMA-D is assigned to the lowest priority. When the four DMAs simultaneously raise requests for use of the system bus, the system needs to arbitrate the simultaneous requests and conducts an arbitration operation in accordance with the fixed priority order. This method, however, has a drawback. If the DMA-A, DMA-B, and DMA-C continuously raise the bus use request at the same time the DMA-D raises the request, the DMA-D will never have a chance since the DMA-D has the lowest priority.

To attempt to solve the above-described drawback of the fixed priority order method, an arbitration apparatus having a round robin method has been developed. In the round robin method, the priority order is shifted by one each time a plurality of bus use requests are simultaneously raised. More specifically, shifting the priority order means that an initial priority order of A>B>C>D is in turn changed to orders of B>C>D>A, C>D>A>B, D>A>B>C, A>B>C>D, and so on. With this method, the above-described drawback of the fixed priority order could be reduced. In an actual system operation, each DMA independently raises the bus use request and it is rare that the DMAs raise their requests at intervals of an even time period. Accordingly, it may happen that a certain DMA always raises the request at the same time a higher priority DMA raises the request even in the bus arbitration apparatus using the round robin method. In this case, the certain DMA is continuously not given a bus use permission.

SUMMARY

This patent specification describes a novel bus arbitration apparatus. In one example, this novel bus arbitration apparatus includes a storage, a priority order determiner, and an arbitrator. The storage is arranged and configured to store a plurality of selection signals for specifying a priority order against a number N of requests. The priority order determiner is arranged and configured to cause the storage to output one of the plurality of selection signals in a predetermined sequence in response to a demand for arbitration. The arbitrator is arranged and configured to perform an arbitration operation based on the priority order against the number N of requests specified by the one of the plurality of selection signals which is output from the storage.

The storage may store a number N or more of the selection signals for differently specifying the priority order against the number N of requests and may be a re-programmable storage.

The storage may include a plurality of re-programmable registers for storing the plurality of selection signals and an output circuit arranged and configured to output a selection signal stored in a register specified among the plurality of re-programmable registers. In this case, the priority order determiner in turn specifies one of the plurality of re-programmable registers included in the storage in response to each of the demands for arbitration.

The priority order determiner may specify selection signals to be in turn selected in response to the demand for arbitration, out of the plurality of selection signals stored in the storage.

The priority order determiner may include a counter arranged and configured to increment the counter by 1 and to output a counting value to the storage in response to the demand for arbitration and a counter resetter arranged and configured to reset the counter when the counting value counted by the counter matches with an upper limit value, which is externally re-programmable. In this case, the storage outputs one of the plurality of selection signals specified by the counting value output from the counter of the priority order determiner.

The storage may include a plurality of re-programmable registers sequentially connected to form a shift register that shifts data stored therein in response to a signal generated in accordance with the demand for arbitration and that outputs data stored in a last-positioned register of the plurality of re-programmable registers as one of the plurality of selection signals.

The priority order determiner may cause the storage to output one of the plurality of selection signals in a predetermined sequence in response to a demand for arbitration after a request from a requester having a highest priority is permitted by the arbitrator.

The storage may store the plurality of selection signals each including a mode setting signal for setting an operation mode to a first operation mode in which the priority order is changed in accordance with each of the demands for arbitration or to a second operation mode in which the priority order is changed in response to the demand for arbitration made after a presently highest priority requester raises a request and is permitted access to the bus. In this case, the above-mentioned bus arbitration apparatus further includes a gate circuit arranged and configured to pass the demand for arbitration to the priority order determiner when the mode setting signal output together with the selection signal from the storage sets the first operation mode and to pass the demand for arbitration to the priority order determiner after the request raised by the presently highest priority requester is permitted when the mode setting signal sets the second operation mode.

This patent specification further describes a novel method of bus arbitration. In one example, a novel method of bus arbitration includes the steps of storing, determining, and performing. The storing step stores a plurality of selection signals for specifying a priority order against a number N of requests. The determining step determines one of the plurality of selection signals one to another in a predetermined sequence in response to each demand for arbitration. The performing step performs an arbitration operation based on the priority order against the number N of requests specified by the one of the plurality of selection signals which is determined in the determining step The storing step may store a number N or more of the selection signals for differently specifying the priority order against the number N of requests, may store the plurality of selection signals into a re-programmable storage, and may store the plurality of selection signals in a ring form and the determining step in turn determines a portion of the ring form and outputs a selection signal stored in the determined portion of the ring form in response to each of the demands for arbitration.

The determining step may determine selection signals to be in turn determined in response to each of the demands for arbitration, out of the plurality of selection signals stored in the storing step.

The determining step may include the steps of counting a number by incrementing by 1 for each demand for arbitration and resetting the counting step when the number counted in the counting step matches upper limit number which is externally re-programmable. In this case, the determining step specifies one of the plurality of selection signals based on the number counted in the counting step.

The storing step may store the plurality of selection signals into a re-programmable shift register that shifts data stored therein in response to a signal generated in accordance with the demand for arbitration and that outputs data stored in a portion thereof as one of the plurality of selection signals.

The determining step may in turn determine the one of the plurality of selection signals in the predetermined sequence in response to each of the demands for arbitration after a request from requester having a highest priority is permitted in the arbitrating step.

The storing step may store the plurality of selection signals each including a mode setting signal for setting an operation mode to a first operation mode in which the priority order is changed in accordance with each of the demands for arbitration or to a second operation mode in which the priority order is changed in response to the demand for arbitration made after a presently highest priority requester raises a request and is permitted. In this case, the above-mentioned method further includes the steps of gating the determining step with the demand for arbitration when the mode setting signal output together with the selection signal sets the first operation mode and gating the determining step with the demand for arbitration after the request raised by the presently highest priority requester is permitted when the mode setting signal sets the second operation mode.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 is a block diagram of a 16×2 ring shift register included in the bus arbitration apparatus of FIG. 8;

FIG. 10 is an illustration for explaining sixteen 2 bit registers of the 16×2 ring shift register of FIG. 9 and exemplary 2-bit data stored therein;

FIG. 12 is a block diagram of a 16×3 ring shift register included in the bus arbitration apparatus of FIG. 11; and FIG. 13 is an illustration for explaining sixteen 2 bit registers of the 16×3 ring shift register of FIG. 12 and exemplary 2-bit data stored therein.

DETAILED DESCRIPTION OF PREFERRED EMBODIMENTS

Figure 1:
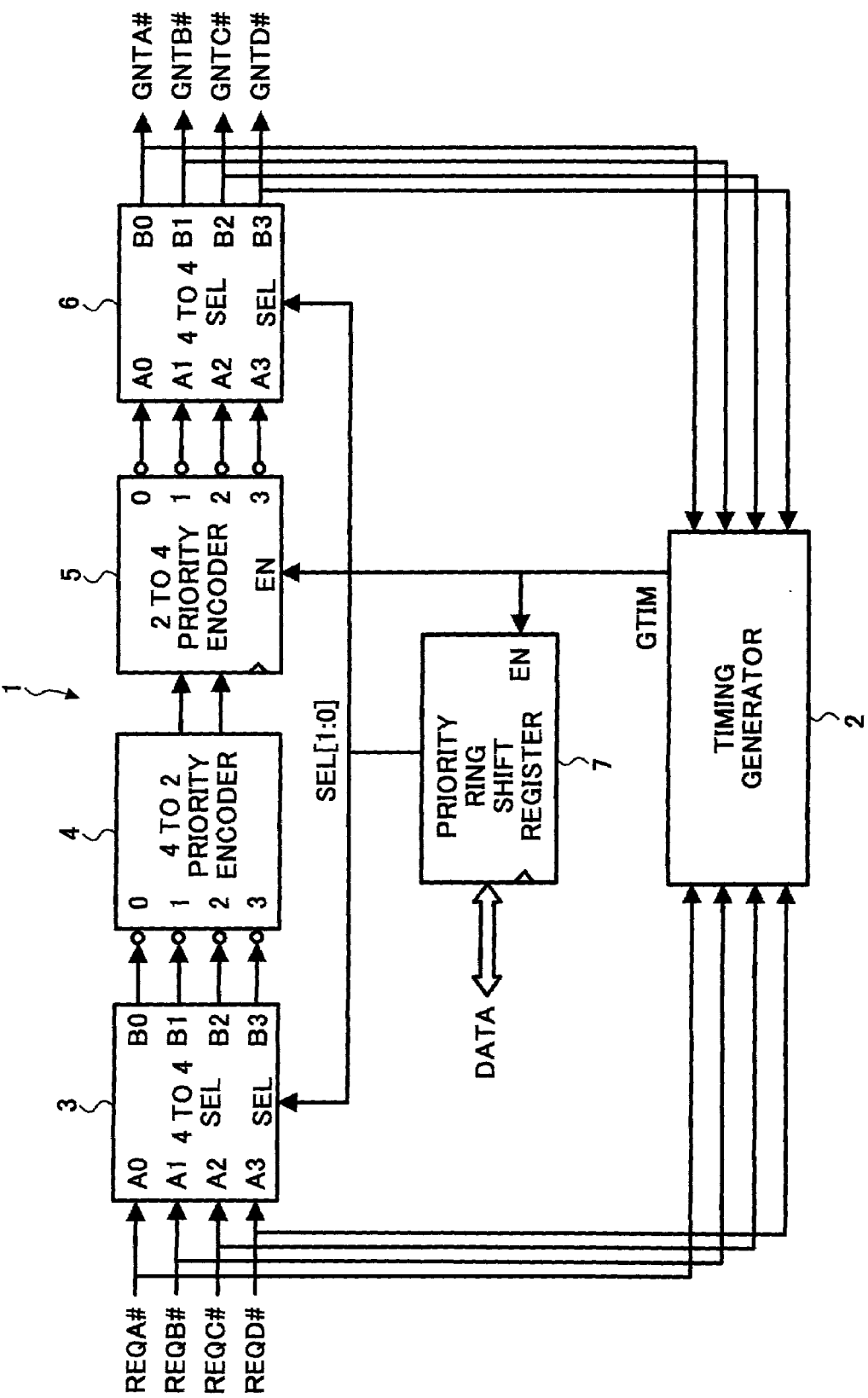
FIG. 1 is a block diagram of a bus arbitration apparatus according to a preferred embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, and more particularly to FIG. 1 thereof, a bus arbitration apparatus 1 according to a preferred embodiment of this patent specification is described. As shown in a block diagram of the bus arbitration apparatus 1 of FIG. 1, the bus arbitration apparatus includes a timing generator 2, selectors 3 and 6, a priority encoder 4, a priority decoder 5, and a priority ring shift register 7. The selector 3 is a 4-to-4 selector and has signal input terminals A0, A1, A2, and A3 for receiving bus use request signals REQA#, REQB#, REQC#, and REQD#, respectively. The bus use request signals REQA#, REQB#, REQC#, and REQD# are sent from DMAs, for example, DMA-A, DMA-B, DMA-C, and DMA-D, respectively, which are not shown. In this description, a signal name given a mark # at its end indicates that the signal is a low-active signal. For example, the bus use request signal REQA# is a low-active signal. On the other hands, a signal name having no mark of # at its end indicates that the signal is a high-active signal. For example, a signal GTIM output by the timing generator 2 is a high-active signal.

The timing generator 2 also receives the bus use request signals REQA#, REQB#, REQC#, and REQD# and can detects an event when more than one DMA simultaneously raise the bus use request. In such an event, the timing generator 2 determines that an arbitration operation is needed and outputs the high-active signal GTIM. The priority ring shift register 7 receives the signal GTIM and outputs a 2-bit selection signal SEL[1:0 ] in a predetermined order in synchronism with the signal GTIM in an active status. The priority ring shift register 7 includes a memory for previously storing values of the 2 bit selection signal SEL[1:0].

In the bus arbitration apparatus 1, the 4-to-4 selector 3, the 4-to-2 priority encoder 4, the 2-to-4 priority decoder 5, and the 4-to-4 selector 6 form an arbitration circuit that performs an arbitration operation in accordance with priorities designated by the selection signal SEL output by the priority ring shift register 7. The selector 6 located at the last stage of the arbitration circuit has signal output terminals B0, B1, B2, and B3 for outputting bus use permission signals GNTA#, GNTB#, GNTC#, and GNTD#, respectively. The bus use permission signals GNTA#, GNTB#, GNTC#, and GNTD# correspond to the bus use request signals REQA#, REQB#, REQC#, and REQD#, respectively, requested by the DMA-A, DMA-B, DMA-C, and DMA-D, respectively. As a result of the arbitration operation performed by the bus arbitration apparatus 1, one of the bus use permission signals GNTA#, GNTB#, GNTC#, and GNTD# is switched to an active signal, so that the corresponding DMA can use the bus.

The timing generator 2 outputs the signal GTIM in an active status, that is, a high (H) signal, to enabling terminals EN of the priority decoder 5 and the priority ring shift register 7 when detecting that more than one DMA simultaneously raise the bus use request during the time the bus is not used. The high-active signal GTIM in an active status acts as a priority change timing signal relative to the priority decoder 5 and the priority ring shift register 7. When still more than one DMA raise the bus use request after the permitted DMA withdraws its bus use request upon completing the bus use, the timing generator 2 again outputs GTIM in an active status, or a high (H) signal.

Figure 2:
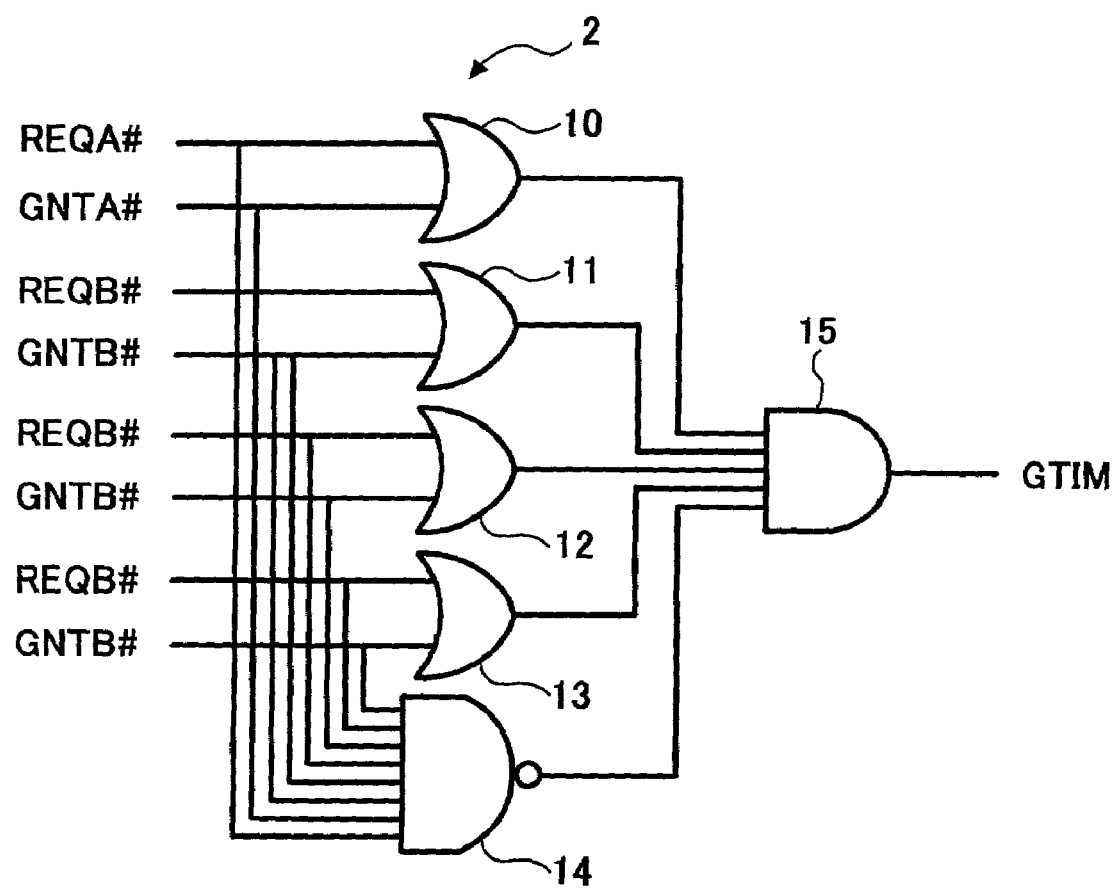
FIG. 2 is a logic circuit diagram of a timing generator included in the bus arbitration apparatus of FIG. 1.

FIG. 2 illustrates an exemplary structure of the timing generator 2. The timing generator 2 includes logic devices including 2-input OR gates 10, 11, 12, and 13, an 8-input NAND gate 14, and a 4-input AND gate 15. The 2-input OR gate 10 receives the bus use request signal REQA# sent from the DMA-A and the bus use permission signal GNTA# sent to the DMA-A. The signal input terminals of the 2-input OR gate 10 are connected to input terminals of the 8-input NAND gate 14, and an output terminal of the 2-input OR gate 10 is connected to an input terminal of the 4-input AND gate 15. Likewise, the 2-input OR gate 11 receives the bus use request signal REQB# and the bus use permission signal GNTB# with respect to the DMA-B, the 2-input OR gate 12 receives the bus use request signal REQC# and the bus use permission signal GNTC# with respect to the DMA-C, and the 2-input OR gate 13 receives the bus use request signal REQD# and the bus use permission signal GNTD# with respect to the DMA-D. The signal input terminals of the 2-input OR gate 11 are connected to input terminals of the 8-input NAND gate 14, and an output terminal of the 2-input OR gate 11 is connected to an input terminal of the 4-input AND gate 15. The signal input terminals of the 2-input OR gate 12 are connected to input terminals of the 8-input NAND gate 14, and an output terminal of the 2-input OR gate 12 is connected to an input terminal of the 4-input AND gate 15. The signal input terminals of the 2-input OR gate 13 are connected to input terminals of the 8-input NAND gate 14, and an output terminal of the 2-input OR gate 13 is connected to an input terminal of the 4-input AND gate 15. The 4-input AND gate 15 has an output terminal for outputting the high-active signal GTIM that acts as the priority change timing signal relative to the 2-to-4 priority decoder 5 and the priority ring shift register 7 when the signal GTIM itself is in an active status, or a high (H) status. That is, the timing generator 2 outputs the signal GTIM in a high (H) status when permitting the bus use responding to the bus use request.

In the 4-to-4 selector 3, connection of the signal input terminals A0, A1, A2, and A3 to the signal output terminals B0, B1, B2, and B3 are arranged on a one-to-one basis such that a plurality of simultaneous bus use requests are assigned with priorities in accordance with a value of the 2-bit selection signal SEL[1:0], which is input to selection terminals SEL of the 4-to-4 selector 3 and the 4-to-4 selector 6 from the priority ring shift register 7, and are output from the signal output terminals B0, B1, B2, and B3 in an order of decreasing priority. For example, when the 2-bit selection signal SEL[1:0] has a data stream of "00," the signal input terminal A0 is connected to the signal output terminal B0, the input terminal A1 is connected to the output terminal B1, the input terminal A2 is connected to the output terminal B2, and the input terminal A3 is connected to the output terminal B3 so that the bus use priorities are assigned to the DMA-A, DMA-B, DMA-C, and DMA-D in order of decreasing priority, that is, the priority is made in the order of A>B>C>D.

Figure 3:
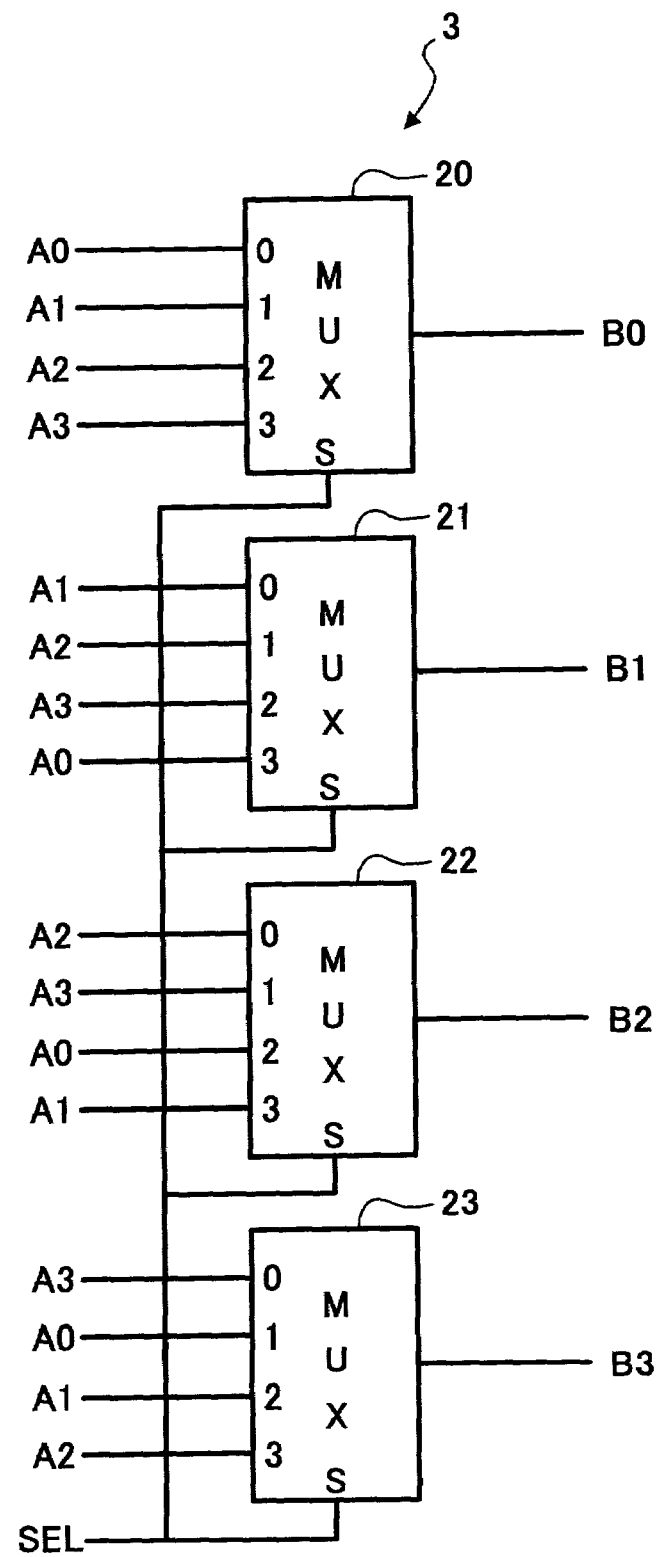
FIGS. 3 and 4 are block diagrams of 4-to-4 selectors included in the bus arbitration apparatus of FIG. 1.

FIG. 3 illustrates an exemplary structure of the 4-to-4 selector 3. The 4-to-4 selector 3 includes multiplexers 20–23. The multiplexer 20 has signal input terminals 0–3 connected to the signal input terminals A0–A3, respectively. Likewise, each of the multiplexers 21–23 has signal input terminals 0–3 connected to the signal input terminals A0–A3, respectively. Each of the multiplexers 20–23 has a setting terminal S connected to the selection terminal SEL to which the 2-bit selection signal SEL[1:0] is input from the priority ring shift register 7. Therefore, in each of the multiplexers 20–23, one of the signal input terminals A0–A3 having a decimal value equivalent to the binary value of the 2-bit selection signal SEL[1:0] is activated by the input of the 2-bit selection signal SEL[1:0] and accordingly the multiplexers 20–23 output the signals B0–B3, respectively.

In the above-described 4-to-4 selector 3, when the 2 bit selection signal SEL[1:0] has a data stream of "00," connections of A0 to B0, A1 to B1, A2 to B2, and A3 to B3 are made so that the priorities are assigned in a way as A>B>C>D. Likewise, when the 2-bit selection signal SEL[1:0] has a data stream of "01," connections of A1 to B0, A2 to B1, A3 to B2, and A0 to B3 are made so that the priorities are assigned in a way as B>C>D>A. When the 2 bit selection signal SEL[1:0] has a data stream of "10," connections of A2 to B0, A3 to B1, A0 to B2, and A1 to B3 are made so that the priorities are assigned in a way as C>D>B>A. When the 2-bit selection signal SEL[1:0] has a data stream of "11," connections of A3 to B0, A0 to B1, A1 to B2, and A2 to B3 are made so that the priorities are assigned in a way as D>A>B>C.

The 4-to-2 priority encoder 4 is often used in a bus arbitration circuit that applies a fixed priority determination method or a round robin determination method, which is known. The 4-to-2 priority encoder 4 has input terminals 0–3 connected to the output terminals B0–B3 of the 4-to-4 selector 3. In the 4-to-2 priority encoder 4, one of the input terminals 0–3 which is in an active status and has the lowest value, that is, the highest priority, is determined and is output as a 2-bit data signal that represents the decimal value of the determined input terminal.

The 2-to-4 priority decoder 5 is also often used in a bus arbitration circuit that applies a fixed priority determination method or a round robin determination method, which is known. The 2-to-4 priority decoder 5 receives the above-mentioned 2-bit data signal output from the 4-to-2 priority encoder 4 and latches the data signal when the enabling terminal EN of the 2-to-4 priority decoder 5 receives the signal GTIM in an active status, that is, in a high (H) status sent from the timing generator 2. The 2-to-4 priority decoder 5 outputs the decimal value of the latched 2-bit data signal by making one of output terminals 0–3 low, representing the decimal value of the latched 2-bit data signal.

In the 4-to-4 selector 6, connection of the signal input terminals A0, A1, A2, and A3 to the signal output terminals B0, B1, B2, and B3 are arranged on a one-to-one basis such that the data converted by the 4-to-4 selector 3 is reconverted into an original state in accordance with the value of the 2-bit selection signal SEL[1:01 ] sent from the priority ring shift register 7.

Figure 4:
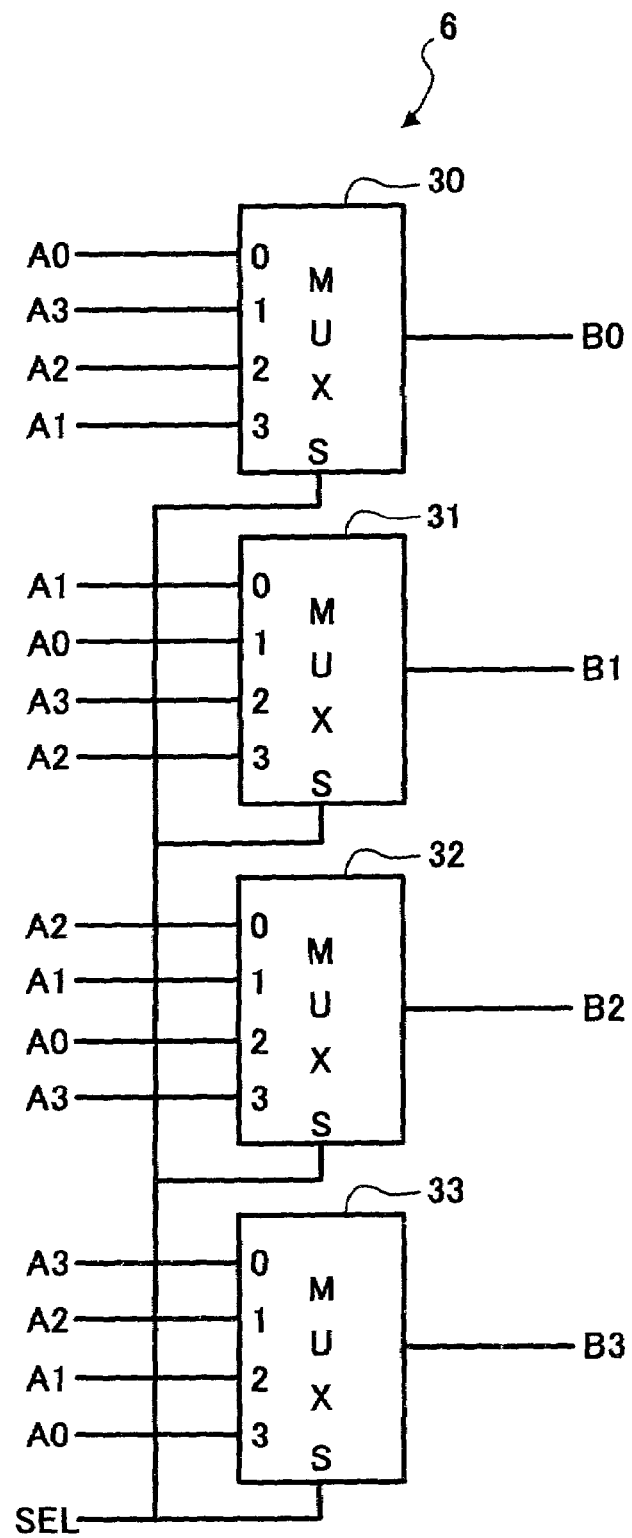

FIG. 4 illustrates an exemplary structure of the 4-to-4 selector 6. The 4-to-4 selector 6 includes multiplexers 30–33. The multiplexer 30 has signal input terminals 0–3 connected to the signal input terminals A0–A3, respectively. Likewise, each of the multiplexers 31–33 has signal input terminals 0–3 connected to the signal input terminals A0–A3, respectively. Each of the multiplexers 30–33 has a setting terminal S connected to the selection terminal SEL to which the 2-bit selection signal SEL[1:0 ] is input from the priority ring shift register 7. Therefore, in each of the multiplexers 30–33, one of the signal input terminals A0–A3 assigned with a decimal value equivalent to the binary value of the 2-bit selection signal SEL[1:0 ] is activated by the input of the 2-bit selection signal SEL[1:0 ] and accordingly the multiplexers 30–33 output the signals B0–B3, respectively.

In the above-described 4-to-4 selector 6, when the 2-bit selection signal SEL[1:0] has a data stream of "00," connections of A0 to B0, A1 to B1, A2 to B2, and A3 to B3 are made. Likewise, when the 2-bit selection signal SEL[1:0 ] has a data stream of "01," connections of A3 to B0, A0 to B1, A1 to B2, and A2 to B3 are made. When the 2-bit selection signal SEL[1:0 ] has a data stream of "10," connections of A2 to B0, A3 to B1, A0 to B2, and A1 to B3 are made. When the 2-bit selection signal SEL[1:0 ] has a data stream of "11," connections of A1 to B0, A2 to B1, A3 to B2, and A0 to B3 are made.

Thus, the 4-to-4 selector 6 outputs the signal GNTA# for the DMA-A from the output terminal B0, the signal GNTB# for the DMA-B from the output terminal B1, the signal GNTC# for the DMA-C from the output terminal B2, and the signal GNTD# for the DMA-D from the output terminal B3, regardless of the designated priorities.

Figure 5:
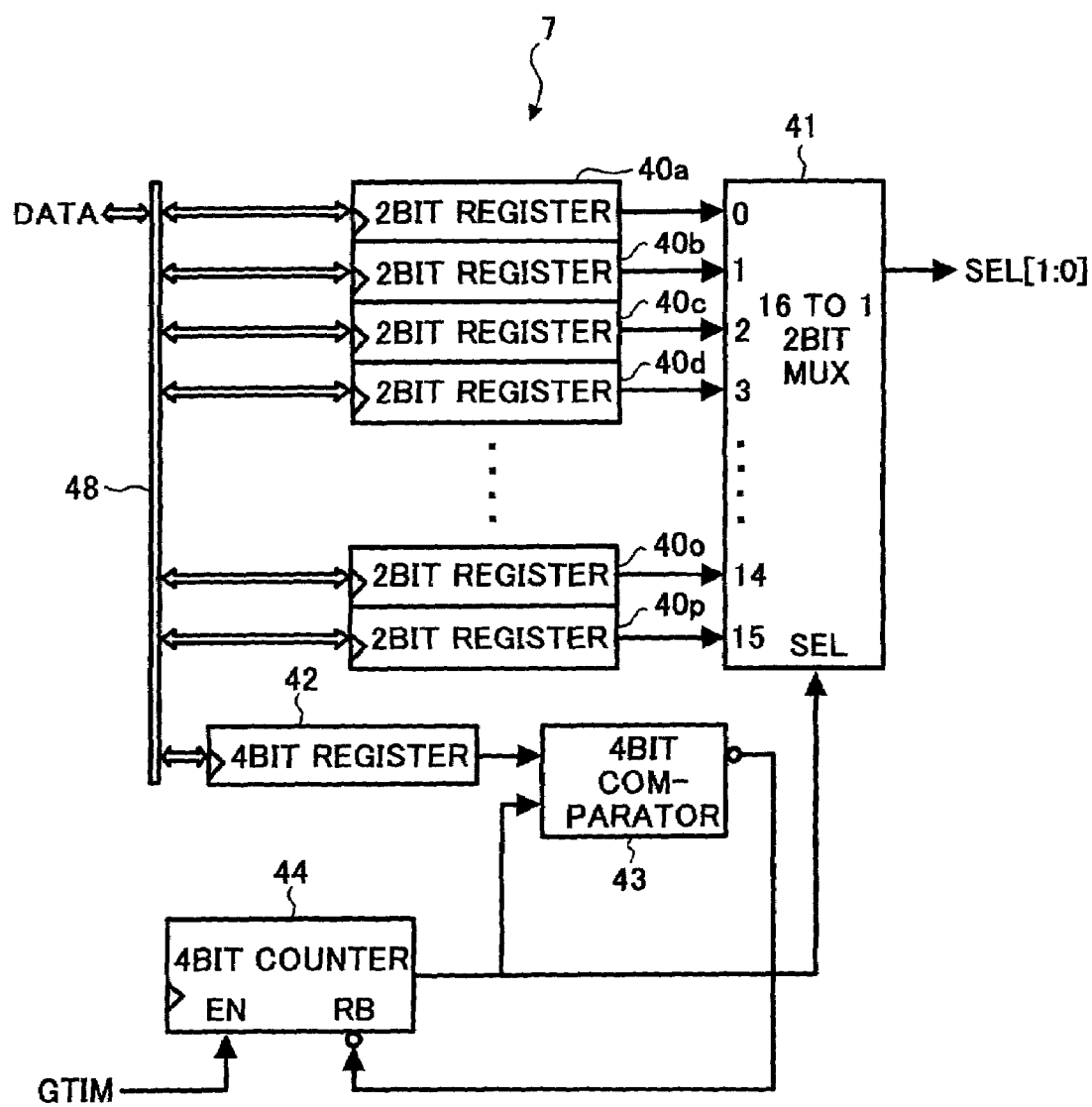
FIG. 5 is a block diagram of a priority ring shift register included in the bus arbitration apparatus of FIG. 1.

FIG. 5 illustrates an exemplary structure of the priority ring shift register 7. The priority ring shift register 7 includes sixteen 2-bit registers 40a–40p, a 2-bit multiplexer 41, a 4-bit register 42, a 4-bit comparator 43, and a 4-bit counter. The sixteen 2-bit registers 40a–40p store data of the respective selection signals SEL[1:0]. The sixteen 2-bit registers 40a–40p output the data to corresponding input terminals 0–15 of the 2-bit multiplexer 41 which is a 16-to-1 multiplexer. The 2-bit multiplexer 41 specifies one of the input terminals 0–15 having a decimal value equivalent to the binary value of a 4-bit selection signal SEL[3:0 ] and outputs the 2-bit selection signal SEL[1:0 ] of the specified input terminal of the 2-bit multiplexer 41. The 4-bit selection signal SEL[3:0 ] is previously stored in the 4-bit register 42 and is input to a selection terminal SEL of the 2-bit multiplexer 41.

The 4-bit counter 44 increments its counting by one each time it receives the priority change timing signal GTIM in an active status, that is, a high (H) status at an enabling terminal, and outputs a 4-bit counting value as the 4-bit selection signal SEL[3:0 ] to the selection terminal SEL of the 2-bit multiplexer 41. The 4-bit counting value of the 4-bit counter 44 is also input to the 4-bit comparator 43. In parallel, the 4-bit comparator 43 receives 4-bit data stored in the 4-bit register 32. When the 4-bit counting value output from the 4-bit counter 44 is equal to the 4-bit data output from the 4-bit register 42, the 4-bit comparator 43 outputs a reset signal to a reset terminal RB of the 4-bit counter 44 so that the 4-bit counter 44 is reset to 0. Thus, the 2-bit multiplexer 41 receives values from 0 up to the one stored in the 4-bit register 42 (i.e., a decimal value of 15) sequentially and repeatedly at its selection terminal SEL. Accordingly, the 2-bit multiplexer 41 sequentially outputs the 2-bit selection signals SEL[1:0] input in the input terminals 0–15 of the 2-bit multiplexer 41 in synchronism with each input of the signal GTIM.

The above-mentioned sixteen 2-bit registers 40a–40p and the 4-bit register 42 are connected to a data bus 48 and the data stored in these registers can arbitrarily be changed through the data bus 48 with an external control apparatus or an external switch (e.g., a plurality of 4-bit dip switches), which are not shown.

Figure 6:
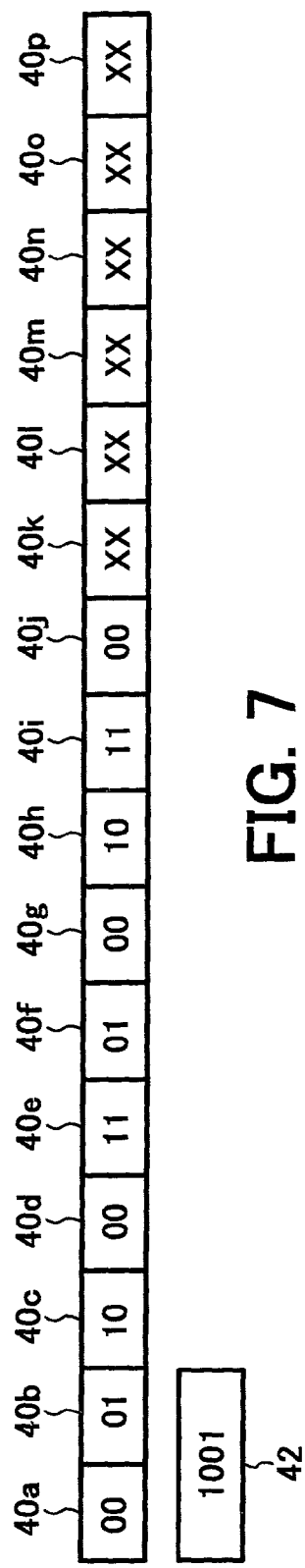
FIG. 6 is an illustration for explaining sixteen 2 bit registers with exemplary 2-bit data stored therein and a 4-bit register with exemplary 4-bit data stored therein, both included in the priority ring shift register of FIG. 5.

FIG. 6 shows an exemplary pattern of the 2-bit selection signal SEL[1:0 ] stored in the sixteen 2-bit registers 40a–40p and which are input to the respective signal input terminals 0–15 of the 2-bit multiplexer 41 and an exemplary pattern of the 4-bit data stored in the 4-bit register 42. In FIG. 6, 2-bit data represented by capital letters XX shown in the 2-bit registers 40k–40p are not used and therefore it can be of any value. In this example, the 4-bit register 42 stores the data of 1001 that has a decimal value of 9. Accordingly, the priority ring shift register 7 sequentially outputs the 2-bit selection signals SEL[1:0], which have been input to the signal input terminals 0–9 of the 2-bit multiplexer 41 from the 2-bit registers 40a–40j, respectively, in synchronism with the signal GTIM in a high (H) status.

Figure 7:
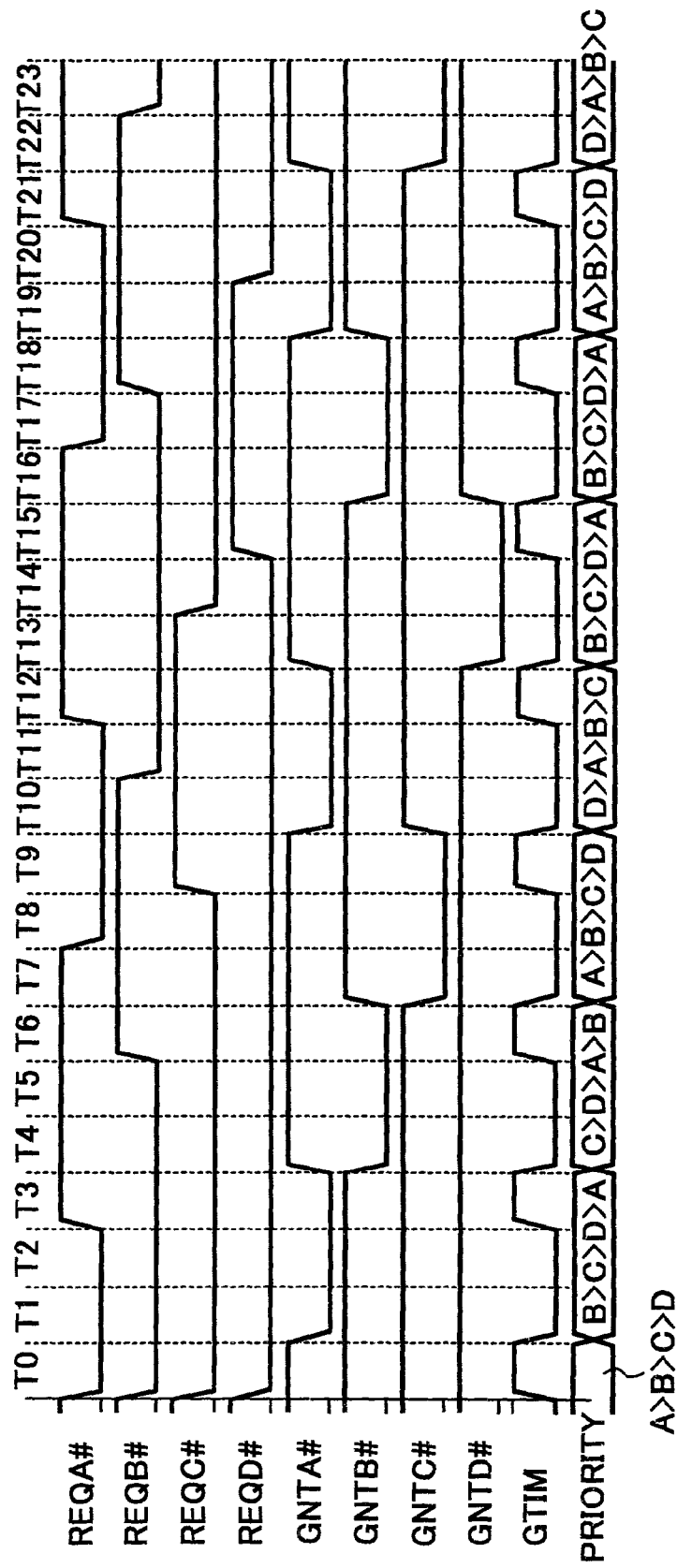
FIG. 7 is a time chart for explaining a bus arbitration operation performed by the bus arbitration apparatus of FIG. 1.

FIG. 7 is an exemplary time chart of the bus arbitration operation performed by the bus arbitration apparatus 1 in which the 2-bit registers 40a–40p and the 4-bit register 42 store data as shown in FIG. 6. This bus arbitration operation is performed when the DMA-A, DMA-B, DMA-C, and DMA-D simultaneously raise the bus use request signals REQA#, REQB#, REQC#, and REQD#, respectively.

In FIG. 7, all of the bus use request signals REQA#, REQB#, REQC#, and REQD# are switched to a low (L) status, that is, an active status, at a time T0 and the signal GTIM is made high (H), that is, an active status. At this time, the priority ring shift register 7 outputs the data 00, which has been stored in the 2-bit register 40a and input to the signal input terminal 0 of the 2-bit multiplexer 41, thereby determining the bus use priority as A>B>C>D.

Then, at a time T1, the bus use permission signal GNTA# for the DMA-A having the highest priority is turned to an active status, that is, a low (L) status. At the same time, the 4-bit counter 44 is incremented by 1 in response to the signal GTIM and outputs a decimal value 1 so that the 2-bit multiplexer 41 selects the signal input terminal 1 thereof and outputs the data 01 of the signal input terminal, which is input from the 2-bit register 40b, thereby changing the bus use priority to B>C>D>A.

At a time T3, the DMA-A completes the use of the bus and the bus use request signal REQA# is changed to an inactive status, that is, a high (H) status. Thereby, the signal GTIM is again made high (H) and, at a time T4, the bus use permission signal GNTB# for the DMA-B that now has the highest priority is turned to an active status, that is, a low (L) status. At the same time, the 4-bit counter 44 is incremented by 1 in response to the signal GTIM and outputs a decimal value 2 so that the 2-bit multiplexer 41 selects the signal input terminal 2 thereof and outputs the data 10 of the signal input terminal, which is input from the 2-bit register 40*c*, thereby changing the bus use priority to C>D>A>B. Likewise, the operation proceeds in a similar manner and the bus use priority to A>B>C>D, D>A>B>C, and so on.

When the 4-bit counter 44 counts the data 1001 in response to the signal GTIM in the high (H) status and outputs a decimal value 9, the 2-bit multiplexer 41 selects the signal input terminal 9 that receives the data 00 sent from the 2-bit register 40*j*. This part of the process is not shown in FIG. 7. At this time, since a value of the 4-bit counter 44 matches with a value of the 4-bit register 42, the 4-bit counter 44 is reset to 0000 by the 4-bit comparator 43. Therefore, the 4-bit counter 44 causes the 2-bit multiplexer 41 to select the data from the 2-bit register 40*a* again in the next cycle.

Figure 8:
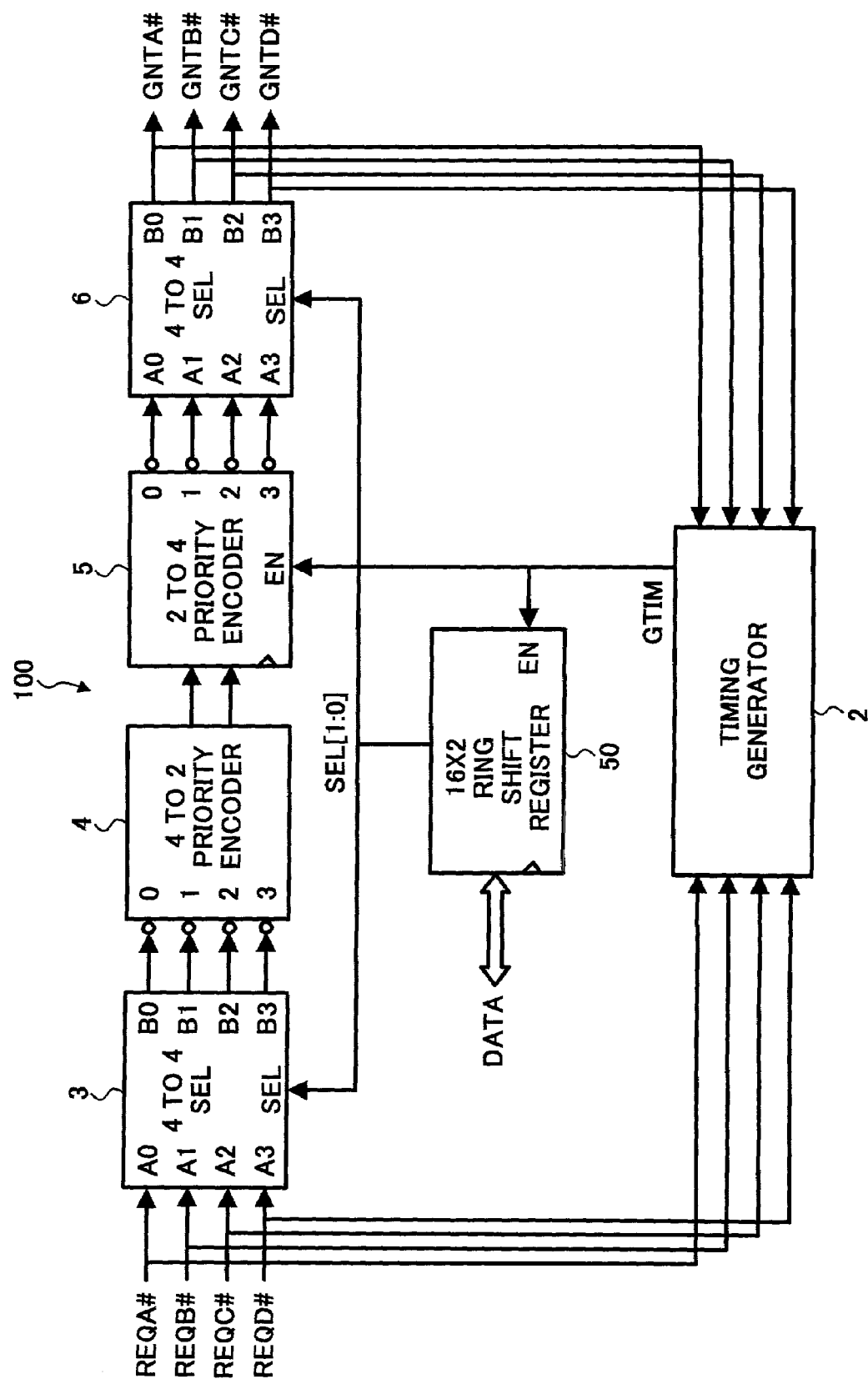
FIG. 8 is a block diagram of another bus arbitration apparatus according to another preferred embodiment.

Next, another exemplary bus arbitration apparatus 100 is explained with reference to FIGS. 8–10. FIG. 8 illustrates the exemplary bus arbitration apparatus 100 which is similar to the bus arbitration apparatus 1, except for a 16×2 ring shift register 50 in place of the priority ring shift register 7.

As shown in FIG. 9, the 16×2 ring shift register 50 of the bus arbitration apparatus 100 includes sixteen 2-bit registers 51*a*–51*p* and an AND gate 52. The sixteen 2-bit registers 51*a*–51*p* are sequentially connected to form a ring-formed shift register and are commonly triggered with the signal GTIM in a high (H) status to shift the data stored. The 2-bit register 51*a* of this ring-formed shift register outputs its 2-bit data as a selection signal SEL[1:0].

The 2-bit registers 51*a*–51*p* are initially provided with data to store in turn 2-bit selection signal SEL[1:0], as shown in FIG. 10, for example. The signal input terminals of the registers 51*a*–51*o* are respectively connected to the signal output terminals of the immediately previous registers 51*b*–51*p*. The signal output terminal of the register 51*a* outputting the stored selection signal SEL[1:0 ] is connected to the signal input terminal of the register 51*p* and to the selection terminals SEL of the 4-to-4 selector 3 and the 4-to-4 selector 6.

When the signal GTIM and a clock CLK are both made high (H), the AND gate 52 generates a trigger high (H) signal which is commonly input to the registers 51*a*–51*p* to shift the 2-bit data stored in this ring-formed shift register. As a result, the register 51*a* outputs its 2-bit data as the 2-bit selection signal SEL[1:0]. The 2-bit data stored in the registers 51*a*–51*p* can be arbitrarily changed with an external control apparatus or an external switch connected thereto through a bus 58.

The bus arbitration apparatus 100 having the above-described structure performs a bus arbitration operation exclusive of the variable counter function achieved by the 4-bit register 42, the 4-bit comparator 43, and the 4-bit counter 4 of the bus arbitration apparatus 1. However, other that such variable counter function, the bus arbitration operation of the bus arbitration apparatus 100 is similar to that of the bus arbitration apparatus 1 and therefore a description for the bus arbitration operation of the bus arbitration apparatus 1 is omitted.

Figure 11:
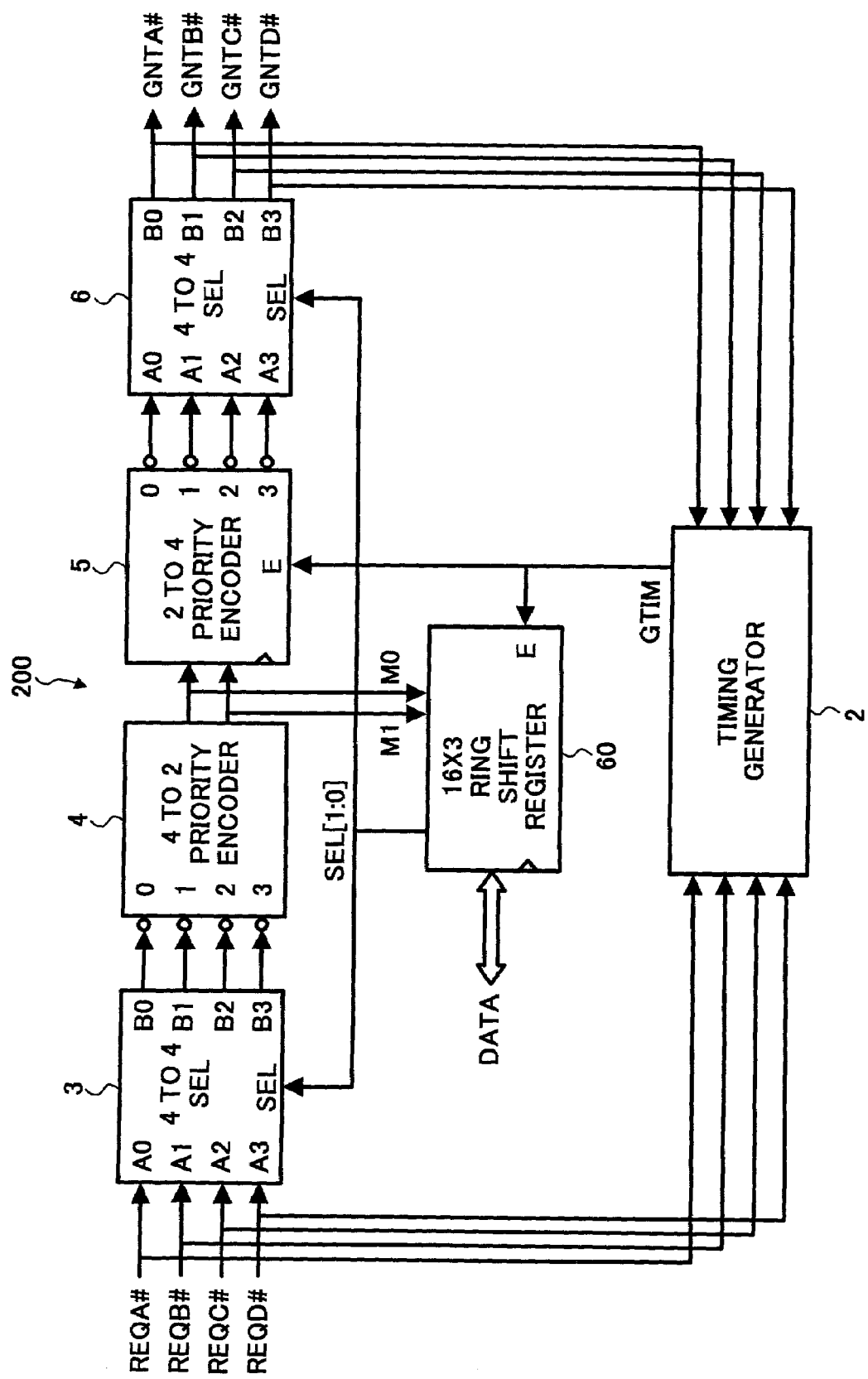
FIG. 11 is a block diagram of another bus arbitration apparatus according to another preferred embodiment.

Next, another exemplary bus arbitration apparatus 200 is explained with reference to FIGS. 11–13. FIG. 11 illustrates the exemplary bus arbitration apparatus 200 which is similar to the bus arbitration apparatus 100, except for a 16×3 ring shift register 60 in place of the 16×2 ring shift register 50. The 16×3 ring shift register 60 performs a function of changing the priority order in response to the signal GTIM in an active status, that is, a high (H) status, after the DMA having the highest priority in the then selected priority order is given a bus use permission. This function is not performed by the 16×2 ring shift register 50 of the bus arbitration apparatus 100. As shown in FIG. 1 the 16×3 ring shift register 60 of the bus arbitration apparatus 200 uses 2-bit data output from the 4-to-2 priority encoder 4 as control signals, as well as the signal GTIM. The 2-bit data from the 4-to-2 priority encoder 4 used as the control signals includes a lower bit M0 and an upper bit M1.

As shown in FIG. 12, the 16×3 ring shift register 60 of the bus arbitration apparatus 200 includes sixteen 3-bit registers 61*a*–61*p*, a NOR gate 62, a OR gate 63, and an AND gate 64. The sixteen 3-bit registers 61*a*–61*p* are sequentially connected to form a ring-formed shift register and are initially provided with data in turn to store 3-bit selection signal SEL[2:0], as shown in FIG. 13, for example. The 3-bit selection signal SEL[2:0] includes data of 3 bits made of lower 2 bits representing the above-described selection signal SEL[1:0] and the highest bit representing data for setting an operation mode.

When the selection signal SEL[2:0] has the above-mentioned highest bit set to 1, the 16×3 ring shift register 60 is switched into a first operation mode in which the priority order is changed each time the signal GTIM is made high (H) or active.

When the selection signal SEL[2:0] has the highest bit set to 0, the 16×3 ring shift register 60 is switched into a second operation mode in which the priority order is changed when the signal GTIM is made high (H) or active after the DMA having the highest priority in the present bus use priority order requests the bus use and completes the use of the bus.

The signal input terminals of the 3-bit registers 61*a* –61*o* are respectively connected to the signal output terminals of the immediately previous registers 61*b*–61*p*, and the signal output terminal of the register 61*a* is connected to the signal input terminal of the register 61*p*.

The data of the lower 2 bits included in the 3-bit selection signal SEL[2:0] output from the 3-bit register 61*a* is sent, as the selection signal SEL[1:0], to the selection terminals SEL of the 4-to-4 selector 3 and the 4-to-4 selector 6. The data of the highest bit included in the 3-bit selection signal SEL[2:0] is sent, as a selection signal SEL[2], to signal input terminals of the NOR gate 62 and the OR gate 63.

The circuit of the NOR gate 62 and the OR gate 63 acts to cause the 3-bit registers 61*a*–61*p* to shift the respective 3-bit data stored therein and to output the next selection signal SEL[2:0] from the 3-bit register 61*a* in synchronism with the signal GTIM in an active status, that is, a high (H) status, when the selection signal SEL[2], which is the highest bit of the 3-bit data output from the 3-bit register 61*a*, is 1, that is, the operation mode is set to the first operation mode.

However, when the selection signal SEL[2] is 0, that is, the operation mode is set to the second operation mode, the circuit of the NOR gate 62 and the OR gate 63 acts to cause the 3-bit registers 61*a*–61*p* to shift the respective 3-bit data stored therein and to output the next selection signal SEL [2:0] in synchronism with the signal GTIM in an active status, that is, a high (H) status, when both 1-bit data M0 and M1 output from the 4-to-2 priority encoder 4 are 0. The time when both 1-bit data M0 and M1 are 0 is a time after the presently highest priority DMA raises the bus use request and the bus arbitration apparatus 200 provides this DMA with the bus use permission.

The bus arbitration apparatus 200 having the above-described structure can selectively change the operation mode to the second operation mode in which the bus arbitration apparatus 200 changes the bus use priority order after giving the presently highest priority DMA the bus use permission when a plurality of DMAs including the presently highest priority DMA simultaneously raise the bus use request. Therefore, the bus arbitration apparatus 200 can set the bus use priority for a plurality of the bus users in a flexible and safe manner.

In addition, it is possible to add the circuit of the NOR gate 62, the OR gate 63, and the AND gate 64 of the bus use apparatus 200 to the priority ring shift register 7 of the bus arbitration apparatus 1 by connecting the above-mentioned circuit to the enabling terminal EN of the 4-bit counter (FIG. 5) of the priority ring shift register 7 of the bus arbitration apparatus 1. Thereby, the bus arbitration apparatus 1 can have the function for changing the bus use priority order in response to the signal GTIM after the presently highest priority DMA is given the bus use permission when a plurality of DMAs including the presently highest priority DMA simultaneously raise the bus use request.

The features of the present patent specification may be conveniently implemented using a conventional general purpose digital computer programmed according to the teaching of the present patent specification, as will be apparent to those skilled in the computer art. Appropriate software coding can readily be prepared by skilled programmers based on the teachings of the present disclosure, as will be apparent to those skilled in the software art. The features of the present patent specification may also be implemented by application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced other than as specifically described herein.

This paten specification is based on Japanese patent application No. JPAP2001-035257 filed on Feb. 13, 2001, in the Japanese Patent Office, the entire contents of which are incorporated by reference herein.

What is claimed is:

1. A bus arbitration apparatus, comprising:
    a storage arranged and configured to store a plurality of selection signals for specifying a priority order against a number N of requests for use of a bus;
    a priority order determiner arranged and configured to cause said storage to output one of said plurality of selection signals in a predetermined sequence in response to a demand for arbitration; and
    an arbitrator arranged and configured to perform an arbitration operation based on said priority order against said number N of requests specified by said one of said plurality of selection signals which is output from said storage,
    wherein the selection signal output from said storage places the requests in a corresponding order of decreasing priority.

2. A bus arbitration apparatus as defined in claim 1, wherein said storage stores a number N or more of said selection signals for differently specifying said priority order against said number N of requests.

3. A bus arbitration apparatus as defined in claim 1, wherein said storage is a re-programmable storage.

4. A bus arbitration apparatus as defined in claim 3, wherein said storage comprises:
    a plurality of re-programmable registers for storing said plurality of selection signals; and
    an output circuit arranged and configured to output a selection signal stored in a register specified among said plurality of re-programmable registers,
    and wherein said priority order determiner in turn specifies one of said plurality of re-programmable registers included in said storage in response to each of said demand for arbitration.

5. A bus arbitration apparatus as defined in claim 1, wherein said priority order determiner specifies selection signals to be in turn selected in response to said demand for arbitration, out of said plurality of selection signals stored in said storage.

6. A bus arbitration apparatus as defined in claim 5, wherein said priority order determiner comprises:
    a counter arranged and configured to increment said counter by 1 and to output a counting value to said storage in response to said demand for arbitration; and
    a counter resetter arranged and configured to reset said counter when said counting value counted by said counter matches an upper limit value which is externally re-programmable,
    and wherein said storage outputs one of said plurality of selection signals specified by said counting value output from said counter of said priority order determiner.

7. A bus arbitration apparatus as defined in claim 3, wherein said storage comprises a plurality of re-programmable registers sequentially connected to form a shift register that shifts data stored therein in response to a signal generated in accordance with said demand for arbitration and that outputs data stored in a last-positioned register of said plurality of re-programmable registers as one of said plurality of selection signals.

8. A bus arbitration apparatus as defined in claim 1, wherein said priority order determiner causes said storage to output one of said plurality of selection signals in a predetermined sequence in response to a demand for arbitration after a request from a requester having a highest priority is permitted by said arbitrator.

9. A bus arbitration apparatus as defined in claim 1, wherein said storage stores said plurality of selection signals each including a mode setting signal for setting an operation mode to a first operation mode in which said priority order is changed in accordance with each demand for arbitration or to a second operation mode in which said priority order is changed in response to said demand for arbitration made after a presently highest priority requester raises a request and is permitted, and said apparatus further comprising a gate circuit arranged and configured to pass said demand for arbitration to said priority order determiner when said mode setting signal output together with said selection signal from said storage sets said first operation mode and to pass said demand for arbitration to said priority order determiner after said request raised by said presently highest priority requester is permitted when said mode setting signal sets said second operation mode.

10. A bus arbitration apparatus, comprising:
    storing means for storing a plurality of selection signals for specifying a priority order against a number N of requests for use of a bus;
    determining means for causing said storing means to output one of said plurality of selection signals in a predetermined sequence in response to a demand for arbitration; and arbitrating means for performing an arbitration operation based on said priority order against said number N of requests specified by said one of said plurality of selection signals which is output from said storing means, wherein the selection signal output from said storing means places the requests in a corresponding order of decreasing priority.

11. A bus arbitration apparatus as defined in claim 10, wherein said storing means stores a number N or more of said selection signals for differently specifying said priority order against said number N of requests.

12. A bus arbitration apparatus as defined in claim 10, wherein said storing means is a re-programmable storage.

13. A bus arbitration apparatus as defined in claim 12, wherein said storing means comprises:

re-programmable registering means for registering said plurality of selection signals;

outputting means for outputting a selection signal stored in a portion specified in said re-programmable registering means, and wherein said determining means in turn specify a portion in said re-programmable registering means included in said storing means in response to each of said demand for arbitration.

14. A bus arbitration apparatus as defined in claim 10, wherein said determining means specifies selection signals to be in turn selected in response to said demand for arbitration, out of said plurality of selection signals stored in said storing means.

15. A bus arbitration apparatus as defined in claim 14, wherein said determining means comprises:

counting means for outputting a counting value to said storing means in response to said demand for arbitration, to increment said counting means by 1; and resetting means for resetting said counting means when said counting value counted by said counting means matches an upper limit value which is externally re-programmable, and wherein said storing means outputs one of said plurality of selection signals specified by said counting value output from said counting means of said determining means.

16. A bus arbitration apparatus as defined in claim 12, wherein said storing means comprises re-programmable registering means forming a shift register that shifts data stored therein in response to a signal generated in accordance with said demand for arbitration and that outputs data stored in a portion of said re-programmable registering means as one of said plurality of selection signals.

17. A bus arbitration apparatus as defined in claim 10, wherein said determining means causes said storing means to output one of said plurality of selection signals in a predetermined sequence in response to a demand for arbitration after a request from a requester having a highest priority is permitted by said arbitrating means.

18. A bus arbitration apparatus as defined in claim 10, wherein said storing means stores said plurality of selection signals each including a mode setting signal for setting an operation mode to a first operation mode in which said priority order is changed in accordance with each demand for arbitration or to a second operation mode in which said priority order is changed in response to a demand for arbitration made after a presently highest priority requester raises a request and is permitted, and said apparatus further comprising gating means for passing said demand for arbitration to said determining means when said mode setting signal output together with said selection signal from said storing means sets said first operation mode and passing said demand for arbitration to said determining means after said request raised by said presently highest priority requester is permitted when said mode setting signal sets said second operation mode.

19. A method of bus arbitration, comprising the steps of:

storing a plurality of selection signals for specifying a priority order against a number N of requests for use of a bus;

selecting one of said plurality of selection signals in a predetermined sequence in response to each demand for arbitration; and performing an arbitration operation based on said priority order against said number N of requests specified by said one of said plurality of selection signals which is selected in said selecting steps, wherein the selected selection signal places the requests in a corresponding order of decreasing priority.

20. A method as defined in claim 19, wherein said storing step stores a number N or more of said selection signals for differently specifying said priority order against said number N of requests.

21. A method as defined in claim 19, wherein said storing step stores said plurality of selection signals into a re-programmable storage.

22. A method as defined in claim 21, wherein said storing step stores said plurality of selection signals in a ring form and said selecting step in turn selects a portion of said ring form and outputs a selection signal stored in said selected portion of said ring form in response to each demand for arbitration.

23. A method as defined in claim 19, wherein said selecting step selects selection signals to be in turn selected in response to each demand for arbitration, out of said plurality of selection signals stored in said storing step.

24. A method as defined in claim 23, wherein said selecting step comprises the steps of:

counting a number by incrementing by 1 for each demand for arbitration; and resetting said counting step when said number counted in said counting step matches an upper limit number which is externally re-programmable, and wherein said selecting step specifies one of said plurality of selection signals based on said number counted in said counting step.

25. A method as defined in claim 21, wherein said storing step stores said plurality of selection signals into a re-programmable shift register that shifts data stored therein in response to a signal generated in accordance with a demand for arbitration and that outputs data stored in a portion thereof as one of said plurality of selection signals.

26. A method as defined in claim 19, wherein said selecting step in turn selects said one of said plurality of selection signals in said predetermined sequence in response to each demand for arbitration after a request from requester having a highest priority is permitted in said arbitrating step.

27. A method as defined in claim 19, wherein said storing step stores said plurality of selection signals each including a mode setting signal for setting an operation mode to a first operation mode in which said priority order is changed in accordance with each demand for arbitration or to a second operation mode in which said priority order is changed in response to said demand for arbitration made after a presently highest priority requester raises a request and is permitted, and said method further comprising the steps of gating said determining step with said demand for arbitration when said mode setting signal output together with said selection signal sets said first operation mode and gating said determining step with said demand for arbitration after said request raised by said presently highest priority requester is permitted when said mode setting signal sets said second operation mode.

28. A method of bus arbitration comprising:

storing a plurality of selection signals each designating a respective priority order for requests for bus access;

providing said selection signals in a predetermined sequence, each selection signal being provided in response to a respective demand for arbitration between said requests for bus access, and the sequence in which the selection signals are provided designating a sequence of priority orders that are not fixed and differ from a round robin priority sequence; and arbitrating access to the bus for said requests for bus access in response to each demand for arbitration in accordance with the respective selection signal provided in response to the demand for arbitration, wherein the selection signal places the requests in a corresponding order of decreasing priority.

29. A system for bus arbitration for requests for bus access comprising:

a memory arrangement storing selection signals each designating a respective different priority order for requests for bus access;

a source of demands for arbitration;

a selection signal providing arrangement coupled with the memory arrangement and the source of demands for arbitration, and responsive to demands for arbitration from said source to provide respective selection signals from said memory arrangement, wherein the selection signals in said sequence designate non-fixed priority orders that differ from a round robin priority sequence, wherein each selection signal output from said memory arrangement places the requests for bus access in a corresponding order of decreasing priority; and an arbitrating arrangement responsive to the selection signals provided from said memory arrangement by said selection signal providing arrangement to arbitrate an order of bus access for said requests.

30. The bus arbitration apparatus of claim 1, wherein said bus arbitration apparatus receives the N requests for use of the bus from N respective bus use requestors, and outputs an activated bus use permission signal to one of the N respective bus use requestors, based on the arbitration operation by the arbitrator, and wherein said priority order determiner causes another one of the plurality of selection signals to be output from said storage after the activated bus use permission signal is output to the one of the N respective bus use requestors.

* * * * *